C. W. TARBET.
DEVICE FOR INFLATING PNEUMATIC TIRES.
APPLICATION FILED SEPT. 14, 1914.
1,234,962. Patented July 31, 1917.
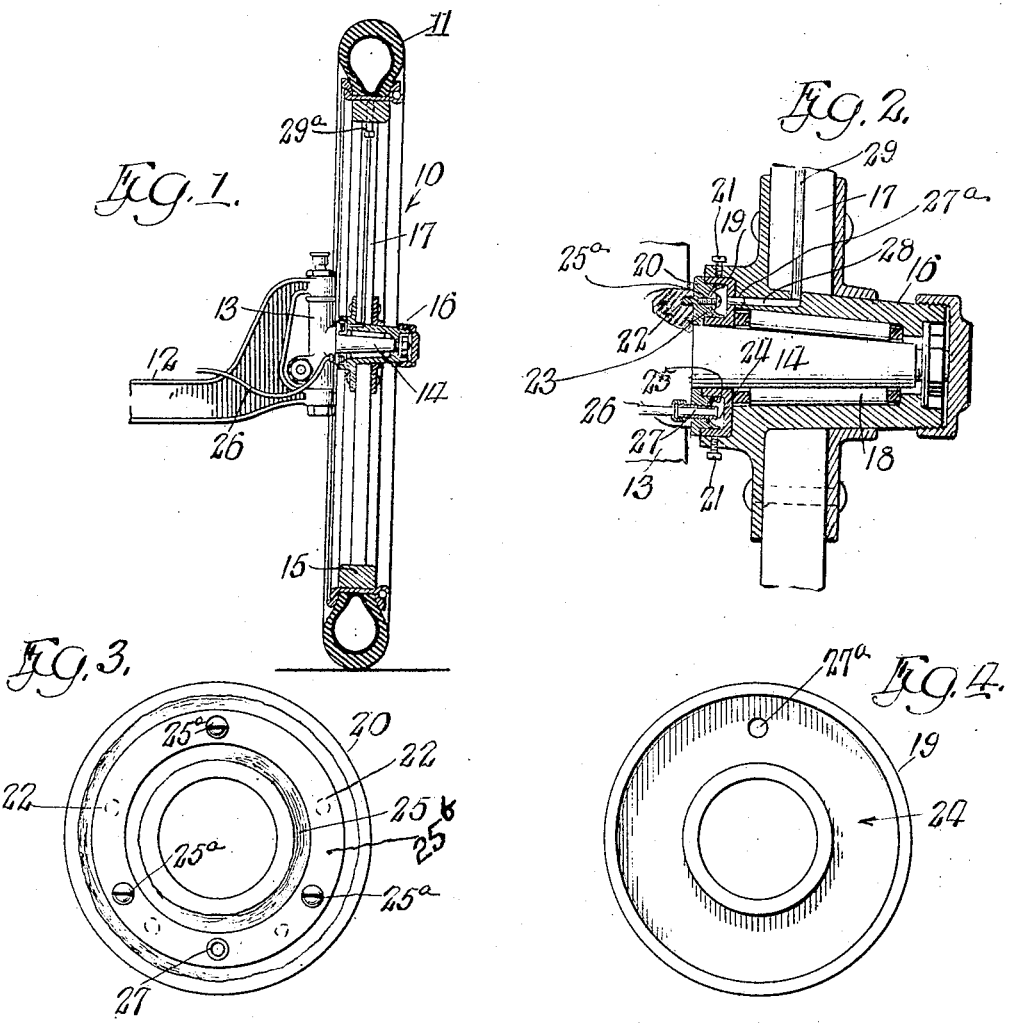

ated July 31, 1917.

UNITED STATES PATENT OFFICE.

CLARENCE W. TARBET, OF CHICAGO, ILLINOIS.

DEVICE FOR INFLATING PNEUMATIC TIRES.

1,234,962.   Specification of Letters Patent.   Patented July 31, 1917.

Application filed September 14, 1914. Serial No. 861,590.

*To all whom it may concern:*

Be it known that I, CLARENCE W. TARBET, a citizen of the United States, and a resident of Chicago, in the county of Cook and State of Illinois, have invented certain new and useful Improvements in Devices for Inflating Pneumatic Tires; and I do hereby declare that the following is a full, clear, and exact description thereof, reference being had to the accompanying drawings, and to the letters of reference marked thereon, which form a part of this specification.

This invention relates to an improvement in devices for inflating pneumatic tires and consists of the matters hereinafter described and more particularly pointed out in the appended claims.

The invention is of particular advantage for use with automobiles, motor-trucks and the like and is capable of attachment to the fluid pressure tank or air compressor usually carried on such machines. The various advantages of the invention will appear as I proceed with my specification.

In the drawings:

Figure 1 is a view representing a transverse section through the wheel of an automobile together with a part of the axle on which said wheel is journaled, said axle being shown in front elevation.

Fig. 2 is a view representing on an enlarged scale a section through the hub of the wheel in the plane of its rotative axis.

Fig. 3 is a front elevation of a member attached to the axle.

Fig. 4 is a similar elevation of a member that is attached to the hub of the wheel, both of which will be more fully referred to later.

In illustrating my invention I have shown it in connection with and applied for the inflation of the tire of a wheel on the front axle of an automobile, where the wheel is mounted on a stub axle which is hinged to swing in a horizontal plane on the main front axle. It will be manifest, however, as I proceed with my specification, that the device is equally applicable for use with a wheel on the rear or other fixed axle of an automobile or motor-truck.

Referring to that embodiment of the invention illustrated in Figs. 1 to 4 inclusive, 10 indicates a wheel on which is mounted a pneumatic tire 11 in any familiar or usual manner. 12 indicates the wheel axle. In the particular illustration shown in the drawings, the wheel 10 is mounted directly on a stub axle 13 which carries the spindle 14 on which the wheel has rotative bearing.

The wheel may be of any usual construction and as shown comprises the felly 15, the hub 16 and the spokes 17. The hub 16 is retained on the spindle 14 of the stub axle in any usual or familiar manner and the usual roller or other anti-friction bearing cage 18 is interposed between the two. The parts thus far referred to may be of any usual or desired construction and as they form no part of my invention require no further description.

I provide intermediate the axle, in this case the stub axle, and the hub of the wheel and preferably at the inner end of said hub, a fluid chamber, which is connected on one side with a compressor or a reservoir containing a fluid under pressure, preferably air for inflating the tire and on the other side by a suitable conduit carried by the wheel, with the interior of the pneumatic tire. The said chamber is formed by means of a stationary member, fixed to the axle, and a rotative member fixed to and rotating with the hub of the wheel. In that embodiment of the invention illustrated in Figs. 1 to 4, this chamber is formed by means of an annular grooved ring 19, fixed to the inner end of the wheel hub and by an annular ribbed block 20 fixed to the end of the axle and disposed symmetrically about the spindle thereof, in such manner that the rib engages within the annular groove of the ring 19. As shown the ring 19 is set in a recess at the inner end of the hub and is rigidly held therein by means of set screws 21. The annular block 20 is attached to the end of the axle by means of lugs 22 in such a manner as to prevent rotation of said block with respect to said axle. The rib 23 on its front face engages within the groove in the channel 19 with its annular faces in engagement with the annular inner faces of the wall of said groove. The two parts thus together inclose a chamber 24.

In order to make this chamber air tight I provide a gasket 25 of leather or other suitable material which as shown, in the embodiment now being described, is attached to the rib member 20 by means of a ring 25ᵇ which is securely placed in a manner preventing displacement of the gasket by screws 25ᵃ. This gasket is of such width that its lateral marginal parts engage against the said walls of the chamber 24 in such manner that the fluid in the chamber when under pressure maintains a gas tight joint between the two parts forming the chamber.

26 indicates a tube of any suitable kind connected with the reservoir containing the fluid under pressure (not shown.) Said tube is connected by suitable coupling to a thimble 27 which is attached air tight in an aperture extending through the block 20 and the gasket 25 so as to open into the chamber 24. This construction connects the said reservoir with the chamber 24. The annular ring 19 is tapped at one point to receive a thimble 27ᵃ which connects with an aperture 28 formed in the hub of the wheel. 29 indicates a tube fixed in the hub and communicating with the passageway 28. Said tube 29 is connected with the interior of the tire in a familiar manner, there being interposed in the tube at a point adjacent the tire the usual check valve 29ᵃ (as for example a Schrader valve) for permitting the entrance of air to the tire but for preventing its leaking therefrom.

The operation of the device is apparent from the above description. When the tire is to be inflated, the usual controlling valve on the reservoir containing fluid under pressure to which the tube 26 is connected, is opened. This permits a flow of the compressed fluid (usually air or carbonic acid gas) to the chamber 24, whence it passes through the nipple 27, the passageway 28 and the tube 29 to the tire. When the tire is sufficiently inflated the controlling valve of the reservoir is turned off.

While in describing my invention I have referred to certain details of construction and arrangement of parts it is to be understood that the invention is not limited thereto except as may be pointed out in the appended claims.

Having thus described my invention, I claim as follows:

1. A device of the kind described, in combination with an axle and the wheel thereon, comprising an annular block fixed to said axle, an annular grooved ring fixed to the wheel hub, said block having an annular rib adapted to engage between the peripheral walls defining the groove in said ring, thus providing an annular chamber, said annular rib having an arcuate groove in that face within the groove of the ring fixed to the wheel hub, a gasket in said arcuate groove of said annular block, and a ring-like device in said chamber for holding said gasket in proper position relative to the arcuate groove in said annular block so that the edges of said gasket engage the peripheral walls of said annular grooved ring on said wheel hub.

2. A device of the kind described, in combination with an axle and the wheel thereon, comprising an annular block fixed to said axle, an annular grooved ring fixed to the wheel hub, said block having an annular rib adapted to engage between the peripheral walls defining the groove in said ring thus providing an annular chamber, said annular rib having an arcuate groove in that face within the groove of the ring fixed to the wheel hub, a gasket in said arcuate groove of said annular block, a second ring in said annular chamber engaging said gasket intermediate its peripheral edges and conforming it to the contour of said arcuate groove so that the edges of said gasket engage the peripheral walls of said annular grooved ring on said wheel hub, and means for securing said last mentioned ring to said annular block.

In testimony, that I, claim the foregoing as my invention I affix my signature in the presence of two witnesses, this 10th day of September A. D. 1914.

CLARENCE W. TARBET.

Witnesses:
T. H. ALFREDS,
KARL W. DOLL.

Copies of this patent may be obtained for five cents each, by addressing the "Commissioner of Patents, Washington, D. C."